United States Patent [19]

Tomii et al.

[11] Patent Number: 5,105,290
[45] Date of Patent: Apr. 14, 1992

[54] LIQUID CRYSTAL DISPLAY DEVICE WITH AN INLET SEALANT CONTAINING PARTICLES

[75] Inventors: Hitoshi Tomii, Ebina; Shunji Suzuki, Yokohama; Tetsuya Nakano, Ohmihachiman; Kenji Terada, Moriyama, all of Japan

[73] Assignee: International Business Machines Corporation, Armonk, N.Y.

[21] Appl. No.: 491,418

[22] Filed: Mar. 9, 1990

[30] Foreign Application Priority Data

Mar. 9, 1989 [JP] Japan ................... 1-57044

[51] Int. Cl.$^5$ .............................. G02F 1/13
[52] U.S. Cl. ...................... 359/80; 359/81; 359/82; 428/1
[58] Field of Search ............ 350/343, 344, 334; 428/1; 340/784

[56] References Cited

U.S. PATENT DOCUMENTS

| | | | |
|---|---|---|---|
| 3,990,782 | 11/1976 | Yamasaki | 350/343 |
| 4,443,063 | 4/1984 | Nishiyama | 350/343 |
| 4,820,025 | 4/1989 | Nakanowatari | 350/334 |
| 4,845,306 | 2/1987 | Akai | 350/343 |

FOREIGN PATENT DOCUMENTS

| | | | |
|---|---|---|---|
| 3716856 | 12/1988 | Fed. Rep. of Germany | 350/343 |
| 57-70515 | 5/1982 | Japan | 350/334 |
| 59-84220 | 5/1984 | Japan | 350/343 |
| 60-101520 | 6/1985 | Japan | 350/343 |
| 60-220318 | 11/1985 | Japan | 350/343 |
| 61-98329 | 5/1986 | Japan | 350/334 |
| 61-138235 | 6/1986 | Japan | 350/343 |
| 61-177436 | 8/1986 | Japan | 350/343 |
| 62-129819 | 6/1987 | Japan | 350/343 |
| 62-135813 | 6/1987 | Japan | 350/343 |
| 62-212626 | 9/1987 | Japan | 350/343 |
| 62-231939 | 10/1987 | Japan | 350/334 |
| 63-316827 | 12/1988 | Japan | 350/343 |
| 64-928 | 1/1989 | Japan | 350/334 |
| 1-177018 | 7/1989 | Japan | 350/343 |

*Primary Examiner*—Rolf Hille
*Assistant Examiner*—Minhloan Tran
*Attorney, Agent, or Firm*—Robert M. Trepp

[57] ABSTRACT

A liquid crystal display device and method are described incorporating a liquid crystal container having an inlet, a liquid crystal, and an inlet sealant containing particles sized larger than the thickness of the inlet to the liquid crystal container. The invention overcomes the probelm of permeation of the inlet sealant into the liquid crystal container.

11 Claims, 1 Drawing Sheet

LIQUID CRYSTAL DISPLAY DEVICE WITH AN INLET SEALANT CONTAINING PARTICLES

BACKGROUND OF THE INVENTION

1. Field of the Invention

This invention relates to liquid crystal display devices, and in particular, to a method for sealing a liquid crystal inlet through which liquid crystal is injected into a liquid crystal container.

2. Description of the Prior Art

In recent years, liquid crystal displays have been increasingly used in various types of electronic equipment.

A liquid crystal display device is, for example, composed of a liquid crystal container, in which a liquid crystal is injected. The liquid crystal container comprises two transparent electrode substrates, each having a transparent electrode formed on one surface thereof, facing each other with a small distance between them, which are sealed around the circumference.

In such a liquid crystal display, the uniformity of the liquid crystal display screen is a critical factor for display performance. In a TN-Type liquid crystal display, for example, a difference in the thickness of the liquid crystal container will cause color irregularity to occur when no electric field is applied in a normally black mode, and will also cause differences in electro-optic properties to occur, resulting in unsatisfactory display quality. Therefore, the unevenness in the thickness of the liquid crystal chamber should be within ±0.2 microns.

Although conventional liquid crystal chambers use spherical spacers of glass or plastic between the two transparent electrode substrates facing each other to keep the thickness of the liquid crystal cell uniform, the transparent electrode substrates may be deformed during the baking of the sealant used around the circumference of the liquid crystal container, and also by the entrance of foreign matter into the container. It was difficult to obtain liquid crystal containers of a uniform thickness.

This disadvantage becomes more significant with increases in the chamber size, and particularly, the thickness of the liquid crystal container tends to be larger than the diameter of the spacers at the central portion.

To solve such a problem, a method has been adopted to assure uniform thickness of the liquid crystal container by pressurizing the liquid crystal container after injecting the liquid crystal, in the direction in which the transparent electrode substrates are stacked, under a pressure of about 150 g/cm$^2$ for about one hour, and by sealing the liquid crystal inlet with a sealant such as an ultraviolet curing resin.

By the above described method, however, although the thickness of the liquid crystal container may be made uniform throughout, the sealant may permeate into the display area of the liquid crystal container or to the vicinity thereof in 10 to 20 seconds after sealing the liquid crystal inlet, resulting in low yields. This problem was difficult to solve even if a sealant with high viscosity is used.

SUMMARY OF THE INVENTION

The apparatus and method of making a liquid crystal display device according to this invention is provided comprising the steps of injecting a liquid crystal through a liquid crystal inlet provided on a liquid crystal container, and sealing the liquid crystal inlet using a sealant containing particles having a diameter which is 0.8 to 1.5 times the thickness of the liquid crystal layer in the liquid crystal container.

It is an object of this invention to prevent the sealant from permeating into the display area of the liquid crystal container or the vicinity thereof when the liquid crystal inlet of the liquid crystal container is sealed, and to provide a method of making a liquid crystal display which can effectively achieve a high yield.

According to the method of making a liquid crystal of this invention, the liquid crystal inlet is sealed with the sealant containing particles having a diameter which is 0.8 to 1.5 times the thickness of the liquid crystal layer in the liquid crystal container, and spherical particles function to prevent the sealant from entering into a display area of the liquid crystal chamber or the vicinity thereof when the liquid crystal inlet is sealed.

Therefore, there are extremely few opportunities for the sealant to enter in the display area of the liquid crystal container or its vicinity, and the yield of the product is effectively improved.

The effectiveness of this invention is especially high when an ultraviolet curing resin and the like is used as the sealant, because such a sealant has high tendency to permeate into the display area of the liquid crystal container.

If the diameter of particles mixed in the sealant exceeds 1.5 times the thickness of the liquid crystal layer, it is difficult for the particles to enter into the liquid crystal container through the inlet; and if the diameter is smaller than 0.8 times the thickness of the liquid crystal layer, the sealant permeates easily into the display area of the liquid crystal container.

DESCRIPTION OF THE PREFERRED EMBODIMENTS

Figure 1:
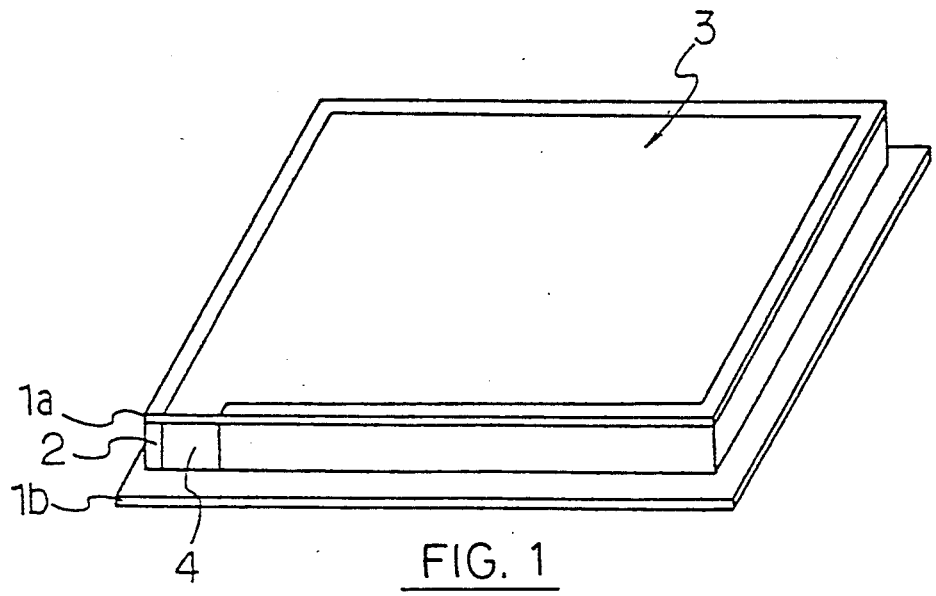
FIG. 1 is a perspective view illustrating one embodiment of a method of making a liquid crystal display device according to this invention.
Figure 2:
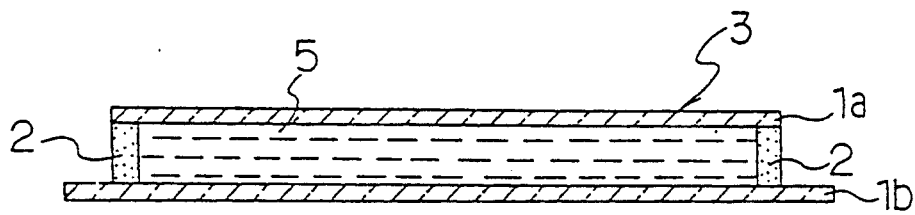
FIG. 2 is a cross-sectional view of the liquid crystal display shown in FIG. 1.
Figure 3:
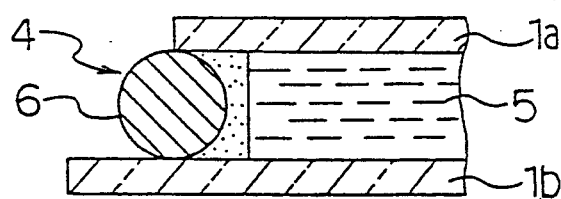
FIG. 3 is a cross-sectional view of the liquid crystal inlet when it is being sealed in accordance with the making method of this invention.
Figure 4:
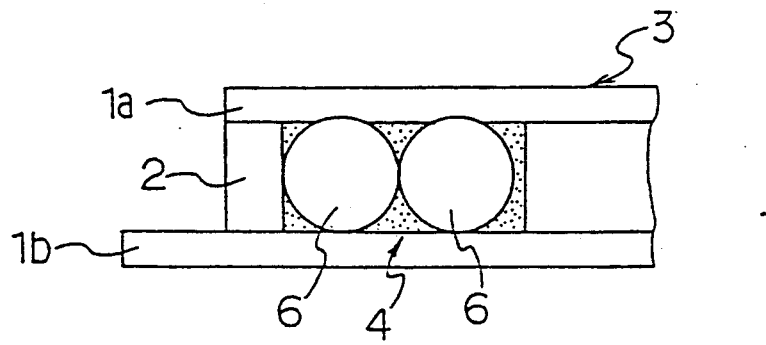
FIG. 4 is a front view of the liquid crystal inlet shown in FIG. 3.

FIGS. 1 through FIG. 4 illustrate one embodiment of a method of making a liquid crystal display according to this invention.

In this embodiment, a liquid crystal 5 is injected through a liquid crystal inlet 4 into a liquid crystal container 3, which is composed of two transparent electrode substrates 1a and 1b spaced at a distance of 10 microns from each other, which is to be the thickness of a liquid crystal layer, and sealed with a sealant 2 around the circumference. The liquid crystal container 3 is then pressurized for about one hour under a pressure of about 150 g/cm$^2$ from the direction in which the transparent electrode substrates 1a and 1b are stacked.

Then, the liquid crystal inlet 4 is sealed.

As the sealant, and ultraviolet curing resin UV-1000 available from Sony Chemical Co. Ltd. of Japan containing Micropearl available from Sekisui Fine Chemicals Co., Ltd. of Japan which are the particles 6 having a diameter of 11 microns was used. The ratio of the ultraviolet curing resin to Micropearl was 1:0.05 by weight.

After sealing the liquid crystal inlet 4, ultraviolet ray or light is irradiated onto the sealant for about 30 seconds to cure it.

The liquid dispay thus produced was checked and no sealant permeation was observed in the display area or its vicinity.

As the reliability test, a heat cycle test from $-40°$ C. to $+100°$ C. was performed for 100 hours, and no abnormality such as the flowout of the sealant was observed.

Furthermore, Micropearl with a particle diameter of 9.5 microns was used to mix the sealant under the same conditions, and the same results were obtained.

This invention is not limited to the embodiment described above, but various modifications may be performed within the spirit and scope of this invention.

In the above embodiment, for example, glass fibers may be used in place of Micropearl to obtain the same results.

Although an ultraviolet curing resin was used in the above embodiment, this invention is not limited thereto, and the same effect will be achieved for example by a silicone-based sealant (normal temperature curing).

Moreover, this invention is not limited to the thickness of the liquid crystal layer in the liquid crystal container of the embodiment described above, or to the materials of the liquid crystals.

As described above, according to the method of making a liquid display of this invention, the use of a sealant containing particles having diameters 0.8 to 1.5 times the thickness of a liquid crystal layer in a liquid crystal container effectively stops the permeation of the sealant into a display area of the liquid crystal container or its vicinity on sealing the liquid crystal inlet of the liquid crystal container.

Therefore, the opportunity for the sealant to permeate into the display area of the liquid crystal container and its vicinity is greatly reduced, and the yield of the product is effectively improved.

We claim:

1. A liquid crystal display device comprising:
    a liquid crystal container having an inlet for inserting liquid therein,
    a liquid crystal positioned in said liquid crystal container, and
    an inlet sealant having particles therein positioned at said inlet to seal said liquid crystal in said liquid crystal container.
    said liquid crystal container includes two transparent electrode substrates facing each other which form major side walls of said liquid crystal container,
    said inlet formed between said major side walls,
    said major side walls separated by a first distance at said inlet,
    said inlet sealant includes particles having a dimension in the range from 1.05 to 1.5 times said first distance, and
    wherein said particles include solid spheres.
2. The liquid crystal display device of claim 1 wherein said particles include fiber glass.
3. The liquid crystal display device of claim 1 wherein said sealant includes a resin curable with ultraviolet rays.
4. The liquid crystal display device of claim 1 wherein said sealant includes silicone.
5. The liquid crystal display device of claim 1 wherein said inlet is rectangular in cross section.
6. A method of making a liquid crystal display device, comprising the steps of:
    injecting a liquid crystal into a liquid crystal container having major side walls through a liquid crystal inlet formed between said major side walls separated by a first distance at said inlet, and
    sealing said liquid crystal inlet with a sealant containing particles having a diameter which is 1.05 to 1.5 times said first distance,
    said step of sealing includes the step of selecting a sealant containing particles including solid spheres.
7. The method of claim 6 wherein said step of sealing includes the step of curing said sealant with ultraviolet rays.
8. The method of claim 6 wherein said step of sealing includes the step of selecting a sealant containinging particles including fiber glass.
9. The method of claim 6 wherein said step of sealing includes the step of selecting a sealant including a resin curable with ultraviolet rays.
10. The method of claim 6 wherein said step of sealing includes the step of selecting a sealant including a silicone.
11. The method of claim 6 wherein said step of injecting includes the step of selecting a liquid crystal container having a liquid crystal inlet with a rectangular cross section.

* * * * *